(12) United States Patent
Huang et al.

(10) Patent No.: US 8,749,543 B2
(45) Date of Patent: Jun. 10, 2014

(54) THREE DIMENSIONAL POLYGON MESH DEFORMATION USING SUBSPACE ENERGY PROJECTION

(75) Inventors: Jin Huang, Hangzhou (CN); Xiaohan Shi, Beijing (CN); Xinguo Liu, Hangzhou (CN); Kun Zhou, Beijing (CN); Li-Yi Wei, Beijing (CN); Baining Guo, Beijing (CN); Heung-Yeung Shum, Beijing (CN)

(73) Assignee: Microsoft Corporation, Remond, WA (US)

( * ) Notice: Subject to any disclaimer, the term of this patent is extended or adjusted under 35 U.S.C. 154(b) by 1399 days.

(21) Appl. No.: 11/464,721

(22) Filed: Aug. 15, 2006

(65) Prior Publication Data

US 2008/0043021 A1    Feb. 21, 2008

(51) Int. Cl.
*G06T 15/00* (2011.01)
*G06T 17/00* (2006.01)
*G06T 13/00* (2011.01)
*G09G 5/00* (2006.01)

(52) U.S. Cl.
USPC ........... 345/419; 345/420; 345/428; 345/473; 345/619

(58) Field of Classification Search
None
See application file for complete search history.

(56) References Cited

U.S. PATENT DOCUMENTS

| | | | |
|---|---|---|---|
| 5,953,463 A | 9/1999 | Tanaka et al. | |
| 6,256,039 B1 * | 7/2001 | Krishnamurthy | 345/420 |
| 6,271,856 B1 * | 8/2001 | Krishnamurthy | 345/581 |
| 6,525,722 B1 * | 2/2003 | Deering | 345/419 |
| 6,608,631 B1 * | 8/2003 | Milliron | 345/647 |
| 6,700,586 B1 | 3/2004 | Demers | |
| 6,724,393 B2 * | 4/2004 | Perry et al. | 345/581 |
| 6,766,043 B2 * | 7/2004 | Zeng et al. | 382/128 |
| 6,847,462 B1 * | 1/2005 | Kacyra et al. | 356/601 |
| 6,900,809 B2 | 5/2005 | Qi | |
| 6,970,171 B2 | 11/2005 | Baraff et al. | |
| 6,982,715 B2 | 1/2006 | Isenburg | |
| 7,236,170 B2 * | 6/2007 | Sepulveda | 345/423 |
| 7,286,127 B2 * | 10/2007 | Zhou et al. | 345/420 |
| 7,292,250 B2 * | 11/2007 | Sepulveda | 345/473 |
| 7,359,538 B2 * | 4/2008 | Zeng et al. | 382/131 |
| 2003/0179203 A1 | 9/2003 | Bruderlin et al. | |

(Continued)

FOREIGN PATENT DOCUMENTS

WO    WO2005116932    12/2005

OTHER PUBLICATIONS

Sorkine et al, Laplacian Surface Editing, Eurographics Symposium on Geometry Processing, The Eurographics Association, 2002, pp. 175-184.*

(Continued)

*Primary Examiner* — Tize Ma
(74) *Attorney, Agent, or Firm* — Carole Boelitz; Micky Minhas

(57) ABSTRACT

A computer implemented method for deforming a 3D polygon mesh using non-linear and linear constraints. The method includes creating a coarse control 3D polygon mesh that completely encapsulates the 3D polygon mesh to be deformed, projecting the deformation energy of the 3D polygon mesh and the constraints of the 3D polygon mesh to the vertices, or subspace, of the coarse control 3D polygon mesh, and determining the resulting deformed 3D polygon mesh by iteratively determining the deformation energy of the subspace. The constraints may be either linear or non-linear constraints, for example, a Laplacian constraint, a position constraint, a projection constraint, a skeleton constraint, or a volume constraint.

20 Claims, 6 Drawing Sheets

(56) References Cited

U.S. PATENT DOCUMENTS

| | | | |
|---|---|---|---|
| 2003/0184603 A1 | 10/2003 | Marshall et al. | |
| 2004/0056871 A1* | 3/2004 | Milliron | 345/647 |
| 2004/0075659 A1* | 4/2004 | Taubin | 345/428 |
| 2004/0085320 A1 | 5/2004 | Kudoh et al. | |
| 2004/0179013 A1 | 9/2004 | Menache | |
| 2004/0227761 A1* | 11/2004 | Anderson et al. | 345/473 |
| 2005/0062742 A1 | 3/2005 | Fery | |
| 2005/0195185 A1* | 9/2005 | Slabaugh et al. | 345/419 |
| 2006/0001673 A1 | 1/2006 | Brand | |
| 2006/0290693 A1* | 12/2006 | Zhou et al. | 345/420 |
| 2007/0086678 A1* | 4/2007 | Chefd'hotel et al. | 382/294 |
| 2007/0122016 A1* | 5/2007 | Brejl et al. | 382/128 |
| 2007/0124137 A1* | 5/2007 | D'Haes | 704/201 |
| 2008/0043021 A1* | 2/2008 | Huang et al. | 345/428 |
| 2008/0143711 A1* | 6/2008 | Zhou et al. | 345/420 |
| 2008/0309664 A1* | 12/2008 | Zhou et al. | 345/420 |
| 2008/0316202 A1* | 12/2008 | Zhou et al. | 345/419 |
| 2009/0002376 A1* | 1/2009 | Xu et al. | 345/473 |

OTHER PUBLICATIONS

Jin Huang et al, "Subspace gradient domain mesh deformation", ACM Transactions on Graphics (TOG)—Proceedings of ACM Siggraph 2006 TOG Homepage, vol. 25 Issue 3, Jul. 2006, pp. 1126-1134, ACM New York, NY, USA.*

J.P. Lewis, Matt Cordner, and Nickson Fong; "Pose Space Deformation: A Unified Approach to Shape Interpolation and Skeleton-Driven Deformation" 2000 http://delivery.acm.org/10.1145/350000/344862/p165-lewis.pdf?key1=344862&key2=6351825411&coll=GUIDE&dl=GUIDE&CFID=73895332&CFTOKEN=23382255.

Sotiris Malassiotis and Michael G. Strintzis, "Tracking textured deformable objects using a finite-element mesh"; IEEE; Oct. 1998 http://ieeexplore.ieee.org/xpls/abs_all.jsp?arnumber=728419&isnumber=15695.

Jernej Barbic and Doug James; "Real-Time Subspace Integration for St.Venant-Kirchho Deformable Models"; Carenegie Mellon University; Copyright 2005 by the Association for Computing Machinery, Inc. http://delivery.acm.org/10.1145/1080000/1073300/p982-barbic.pdf?key1=1073300&key2=6452825411&coll=GUIDE&dl=GUIDE&CFID=73896509&CFTOKEN=18748427.

Yongyi Yang, Miles N. Wernick and Jovan G. Brankov; "A Fast Approach for Accurate Content-Adaptive Mesh Generation"; IEEE; Aug. 2003 http://www.ipl.iit.edu/brankov/published/IEEE%20JNL%202003%201P%20A%20fast%20approach%20for%20accurate%20content-adaptive%20mesh%20generation%20.pdf.

Alexa, "Differential coordinates for local mesh morphing and deformation", Feb. 14, 2003.

Au, "Mesh Editing with Curvature Flow Laplacian Operator", Jul. 2005.

Bendels, "Mesh Forging: Editing of 3D-Meshes Using Implicitly Defined Occluders", In Proceedings of the First Eurographics Symposium on Geometry Processing, Jun. 23-25, 2003.

Botsch, "Multiresolution Surface Representation Based on Displacement Volumes", Computer Graphics Forum, Sep. 2003.

Coquillart, "Extended Free-Form Deformation: A Sculpturing Tool for 3D Geometric Modeling", Computer Graphics, Aug. 6-10, 1990.

Desbrun, "Implicit Fairing of Irregular Meshes using Diffusion and Curvature Flow", Proceedings of the 26th Annual Conference on Computer Graphics, Aug. 8-13, 1999.

Guskov, "Normal Meshes", Proceedings of the 27th Annual Conference on Computer Graphics, Jul. 23-28, 2000.

Hirota, "Fast Volume-Preserving Free Form Deformation Using Multi-Level Optimization", Proceedings of the 5th ACM Symposium on Solid Modeling and Applications, Jun. 9-11, 1999.

Hsu, "Direct Manipulation of Free-Form Deformations", Proceedings of the 19th Annual Conference on Computer Graphics and Interactive Techniques, Jul. 1992.

Ju, "Mean Value Coordinates for Closed Triangular Meshes", Proceedings of the ACM Transactions on Graphics, Jul. 2005.

Kaporin, "On a class of nonlinear equation solvers based on the residual norm reduction over a sequence of affine subspaces", SIAM Journal on Scientific Computing, Jan. 1995.

Kavan, "Spherical Blend Skinning: A Real-time Deformation of Articulated Models", Proceedings of the 2005 Symposium on Interactive 3D Graphics, Apr. 3-6, 2005.

Kho, "Sketching Mesh Deformations", Proceedings of the 2005 Symposium on Interactive 3D Graphics, Apr. 3-6, 2005.

Kobbelt, "Interactive Multi-Resolution Modeling on Arbitrary Meshes", Proceedings of the 25th Annual Conference on Computer Graphics, Jul. 19-24, 1998.

Kry, "EigenSkin: Real Time Large Deformation Character Skinning in Hardware", Proceedings of the 2002 ACM SIGGRAPH/Eurographics Symposium on Computer Animation, Jul. 21-22, 2002.

Lander, "Skin Them Bones: Game Programming for the Web Generation", Game Developer, May 1998.

Lee, "Displaced Subdivision Surfaces", Proceedings of the 27th Annual Conference on Computer Graphics, Jul. 23-28, 2000.

Lipman, "Differential Coordinates for Interactive Mesh Editing", International Conference on Shape Modeling and Applications, Jun. 7-9, 2004.

Lipman, "Linear Rotation-invariant Coordinates for Meshes", Proceedings of the ACM Transactions on Graphics, Jul. 2005.

MacCracken, "Free-Form Deformations With Lattices of Arbitrary Topology", Proceedings of the 23rd Annual Conference on Computer Graphics, Aug. 4-9, 1996.

Madsen, "Optimization with Constraints", Informatics and Mathematical Modelling, Technical University of Denmark, Mar. 2004.

Milliron, "A Framework for Geometric Warps and Deformations", Proceedings of the ACM Transactions on Graphics, Jan. 2002.

Neaten, "A Sketch-Based interface for Detail-Preserving Mesh Editing" Proceedings of the ACM Transactions on Graphics, Jul. 2005.

Pinkall, "Computing Discrete Minimal Surfaces and Their Conjugates", Feb. 1993.

Rappoport, "Volume-Preserving Free-Form Solids", Third ACM SIGGRAPH Symposium on Solid Modeling and Applications, May 17-19, 1995.

Sander, "Silhouette Clipping", Proceedings of the 27th Annual Conference on Computer Graphics, Jul. 23-28, 2000.

Sederberg, "Free-Form Deformation of Solid Geometric Models", Proceedings of the 13th Annual Conference on Computer Graphics and Interactive Techniques, Aug. 18-22, 1986.

Sheffer, "Pyramid Coordinates for Morphing and Deformation", Proceedings of the 2nd International Symposium on 3D Data Processing, Visualization, and Transmission, Sep. 6-9, 2004.

Shewchuk, "What is a Good Linear Element? Interpolation, Conditioning, and Quality Measures", Proceedings of the 11th International Meshing Roundtable, Sep. 15-18, 2002.

Singh, "Wires: A Geometric Deformation Technique", Proceedings of the 25th Annual Conference on Computer Graphics, Jul. 19-24, 1998.

Sloan, "Shape by Example", Proceedings of the 2001 Symposium on Interactive 3D Graphics, Mar. 26-29, 2001.

Steihaug, "An Inexact Gauss-Newton Approach to mildly nonlinear problems" (talk also titled: "Mildly Nonlinear Least Squares Problems"), University of Linkoping, Department of Mathematics, Conference: Least Squares Methods: Theory, Algorithms, and Applications, Jan. 9-10, 1995.

Sumner, "Mesh-Based Inverse Kinematics", Proceedings of the ACM SIGGRAPH Transactions on Graphics, Jul. 2005.

Wilhelms, "Anatomically Based Modeling", Proceedings of the 24th Annual Conference on Computer Graphics, Aug. 3-8, 1997.

Yu, "Mesh Editing with Poisson-Based Gradient Field Manipulation", Proceedings of the ACM Transactions on Graphics, Aug. 2004.

Zhou, "Large Mesh Deformation Using the Volumetric Graph Laplacian", Proceedings of the ACM SIGGRAPH Transactions on Graphics, Jul. 2005.

Zorin, "Interactive Multiresolution Mesh Editing", Proceedings of the 24th Annual Conference on Computer Graphics, Aug. 3-8, 1997.

* cited by examiner

THREE DIMENSIONAL POLYGON MESH DEFORMATION USING SUBSPACE ENERGY PROJECTION

BACKGROUND

Three dimensional computer graphics are typically comprised of a polygon mesh including one or more graphical textures which may be applied to the exterior surfaces of the polygon mesh. When rendered by the computer, the polygon mesh and applied graphical textures may appear as a solid three dimensional form. Typically, a user may create a polygon mesh and associated textures using a 3D editor computer application such as MAYA® from AUTODESK®. Once the user has created the polygon mesh and associated textures, the polygon mesh and associated textures may be submitted to a 3D renderer software application, for example, a 3D video game graphics display engine.

A user may also animate a polygon mesh. Typically, a user may specify that a region of a polygon mesh is a unit, for example, if the polygon mesh resembles a human being, a user may specify that the polygon mesh representing a human arm is a single unit. The user may then specify the manner in which polygon mesh units are attached to one another. For example, a user may specify that the polygon mesh unit representing an arm is comprised of a forearm and an upper arm with a joint representing the elbow connecting the forearm and upper arm.

Once the user has created the polygon mesh units and the manifolds between the polygon mesh units, the user may specify a range of motion for the polygon mesh units. For example, the user may specify that the polygon mesh unit representing the forearm begins at a starting point in three dimensional space and then moves towards the polygon mesh unit representing the upper arm, the animation representing a human arm bicep contraction. Such a method for specifying movement in a set of polygon mesh units may be known as mesh deformation.

Because the polygon mesh units do not behave as their physical counterparts in the real world, there may be problems with rendering the result of the user's beginning and end points in the range of motion. For example, a real human arm is comprised of bones and other physical structures surrounded by flesh. When a real human arm contracts, the physical structures within the arm maintain the length of the arm while the real human flesh stretches and contracts where necessary to allow movement. Because a set of polygon mesh units and accompanying graphical textures lack the internal physical structures and elastic flesh of a real human arm, such properties must be modeled using other methods.

For example, a user may add constraints to the polygon mesh units to preserve volume and length. However, such constraints may also increase the number of computations a computer application is required to perform to render the animation in three dimensional spaces. A more computationally efficient method for allowing a user to place volume and length constraints on a three dimensional polygon mesh, deform the polygon mesh, and render the polygon mesh may be useful.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
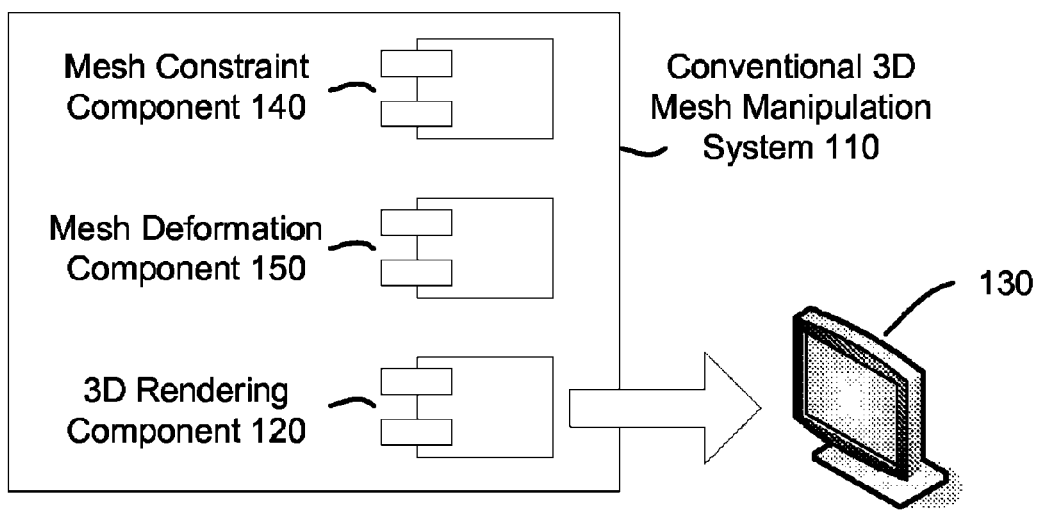
FIG. 1 is a block diagram showing a conventional 3D graphics system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer system, the system described is provided as an example and not a limitation. As those skilled in the art will appreciate, the present examples are suitable for application in a variety of different types of computer systems.

This description relates generally to an automated system and method for producing a deformed polygon mesh from an original mesh using a subspace solving algorithm. A user of a typical three dimensional (3D) polygon mesh manipulation computer application may wish to add movement, or animate, a polygon mesh representing a physical object such as a human being or a virtual object such as a cartoon character. Typically, a 3D polygon mesh manipulation computer application will produce frames of video representing the animated 3D polygon mesh such that viewer may use a simple video player to view the pre-rendered animation. In an alternative example, a user may export a 3D polygon mesh, associated graphic textures, other visual information such as bump maps, and associated three dimensional coordinates representing animated movement to a system designed specifically for rendering 3D polygon mesh animation in real time such as a video game engine.

A user may utilize a conventional 3D polygon mesh manipulation computer application, for example, a 3D editor, to create a mesh, indicate connection points, create textures and other visual effects for the exterior surfaces of the polygon mesh, and place the 3D polygon mesh at a beginning set of 3D coordinates. The user may then specify a new set of 3D coordinates for portions of the 3D polygon mesh which represent the ending points of the motion the user wishes to animate. The conventional 3D polygon mesh manipulation computer application may then calculate the intervening 3D coordinates that the various portions of the 3D polygon mesh will move through as the 3D polygon mesh is "deformed" to the new set of 3D coordinates specified by the user.

For example, a user may use a 3D polygon mesh manipulation computer application to create a 3D polygon mesh representing a human arm and hand. The user may model the hand connected to the forearm. The user may further specify a joint between the hand and the forearm, and specify a range of motion for the hand. The user may then similarly specify a joint between the forearm and upper arm and then specify a range of motion for such a joint.

Once the user has created the initial 3D polygon mesh, specified the joints in the 3D polygon mesh, and specified a range of motion for the joints, the user may position the 3D mesh at an initial set of 3D coordinates in which the arm and hand are fully extended. The user may then specify a new set of 3D coordinates in which the hand is at a forty-five degree angle relative to the forearm and the forearm is at a forty-five degree angle relative to the upper arm. The user may then instruct the 3D polygon mesh manipulation computer application to create the "in between" 3D coordinates. However, the resulting animation may appear unnatural as the conventional 3D polygon mesh manipulation computer application may not have enough information to accurately depict realistic human movement. For example, the conventional 3D polygon mesh manipulation computer application may not maintain the length of the hand, forearm, or arm and as such the hand, forearm, or arm may appear to shrink in length. In another example, the conventional 3D polygon mesh manipulation computer application may not preserve the volume contained by the 3D polygon mesh and the hand, forearm, or arm may appear to unnaturally contract or expand in volume.

A conventional 3D polygon mesh manipulation computer application may allow a user to place a length constraint and a volume constraint on a 3D polygon mesh. However, such constraints may introduce a set of mathematical computations too complex to be calculated in real time for the user. That is, the user may not be able to interact with the 3D polygon mesh using the 3D polygon mesh manipulation computer application and view the results of deforming the 3D polygon mesh in real time due to performance issues, errors in rendering the 3D polygon mesh, and the like.

The following figure describes how a conventional 3D polygon mesh manipulation computer application or system may allow a user to impose skeleton and volume constraints on a 3D polygon mesh. The following figure describes the errors and/or mathematical computation complexities which may result when a conventional 3D polygon mesh manipulation computer application or system deforms a mesh with such constraints.

FIG. 1 is a block diagram showing a conventional 3D graphics system 100. The conventional 3D graphics system 100 may include a conventional 3D polygon mesh manipulation system 110. The conventional 3D polygon mesh manipulation system 110 may be coupled to a conventional mesh constraint component 140, a conventional mesh deformation component 150, and a conventional 3D rendering component 120. The conventional 3D polygon mesh manipulation system 110 may be coupled to a conventional display device 130.

The conventional 3D polygon mesh manipulation system 110 may be any device capable of reading data associated with a 3D polygon mesh, allowing human user interaction with the 3D polygon mesh data, and rendering such 3D polygon mesh data in a visual manner. For example, the conventional 3D polygon mesh manipulation system 110 may be a typical 3D editor computer software application executing on a conventionally constructed personal computer. In an alternative example, the conventional 3D polygon mesh manipulation system 110 may be video game software executing on a video game console.

The conventional 3D rendering component 120 may be, at least, any device capable of receiving and rendering 3D polygon mesh data such that it can be displayed on a conventional display device 130. For example, the conventional 3D rendering component 120 may be a conventionally constructed 3D rendering computer hardware device such as a 3D video graphics card. In an alternative example, the conventional 3D rendering component 120 may be a software 3D renderer executing within a typical operating system executing on a conventionally constructed personal computer.

The conventional display device 130 may be any device capable of receiving video signals from the conventional 3D polygon mesh manipulation system 110 and displaying the result. For example, the conventional display device 130 may be a conventionally constructed computer monitor. In an alternative example, the conventional display device 130 may be a television monitor.

It is to be appreciated that these are examples only and such systems and components may be implemented in a variety of hardware and software systems. For example, the conventional 3D polygon mesh manipulation system 110 and its associated components may be implemented in a video game console, a portable telephone, a handheld computing device, or the like.

The conventional mesh constraint component 140 and conventional mesh deformation component 150 may be typical software components, assemblies, libraries, or the like, which, when executed, performs a service. The conventional mesh constraint component 140 and conventional mesh deformation component 150 may be communicatively coupled by software services provided by the conventional 3D polygon mesh manipulation system 110 such that each may exchange information, instructions, or the like. Further, the conventional mesh constraint component 140 and conventional mesh deformation component 150 may include a combination of software and/or hardware components or the like.

The conventional 3D polygon mesh manipulation system 110 may allow a user to manipulate a 3D polygon mesh and display the resulting conventional deformed 3D polygon mesh on the conventional display device 130. As such, the conventional 3D polygon mesh manipulation system 110 may make use of other conventional hardware and software components to accept user input and display the results.

The conventional mesh constraint component 140 may be used for allowing a user to specify a constraint on the deformation of a conventional 3D polygon mesh. For example, the conventional mesh constraint component 140 may allow a user to specify a control handle and attached control grids on a conventional 3D polygon mesh such that the control handle will allow only the parts of the 3D polygon mesh encapsulated by the control grids to be repositioned in three dimensions.

The conventional mesh deformation component 150 may implement a method for solving, or performing the mathematical calculations necessary, to produce a conventional "deformed" 3D polygon mesh. Such a conventional mesh deformation component 150 may further accept linear constraints as specified by the user using the conventional mesh constraint component 140. A linear constraint may be a constraint which may be expressed as a computer-executable linear mathematical function.

In particular, a 3D polygon mesh may be represented as a tuple (K,X). The variable K may refer to the simplicial complex containing the vertices, edges, and triangles included in the 3D polygon mesh. A simplicial complex may represent a set of simplices, or, multidimensional triangles. Vertices may represent one or more vertexes, or, one or more points where one or more edges of a polygon meet. The variable X may refer to the positions of the vertices associated with the 3D polygon mesh. For example, $X=(x_1, \ldots, x_N)^1, x_i \in R^3$.

More particularly, the conventional mesh deformation component 150 may solve the mesh deformation by implementing the following energy minimization equation in a computer executable form, $$\text{minimize } \frac{1}{2} \sum_{i=1}^{m} \|f_i(X)\|^2$$

using Laplacian coordinates. The use of Laplacian coordinates in the deformation of 3D polygon meshes is known in the art and will not be discussed here. Further, in the equation above, $f_1(X) = \mathcal{L} X - \hat{\delta}$ is for reconstructing X from its Laplacian coordinates $\hat{\delta}(X)$ and $\mathcal{L}$ is the Laplacian operator matrix. In addition, the user may have used the conventional mesh constraint component 140 to specify constraints of the form $f_i(X), i>1$ on the deformation. Such constraints may only be linear constraints as it may not be practical to introduce non-linear constraints into the equation above. For example, the computational power required to solve the above equation with non-linear constraints may be greater than can be provided by a conventionally constructed computing device.

However, should a user desire to add a non-linear constraint such as a volume constraint or skeleton constraint on the conventional 3D polygon mesh, the conventional mesh deformation component 150 may not solve the equation above in an efficient manner. An example of an effect of such inefficiency may be such that the user may not specify a non-linear constraint. Another example of an effect of such inefficiency may be such that the user may not manipulate a 3D polygon mesh interactively, or, in real time, and view the results interactively or in real time. Allowing the introduction of such non-linear constraints and a corresponding method for solving a deformation of a 3D polygon mesh with such non-linear constraints may be useful.

Figure 2:
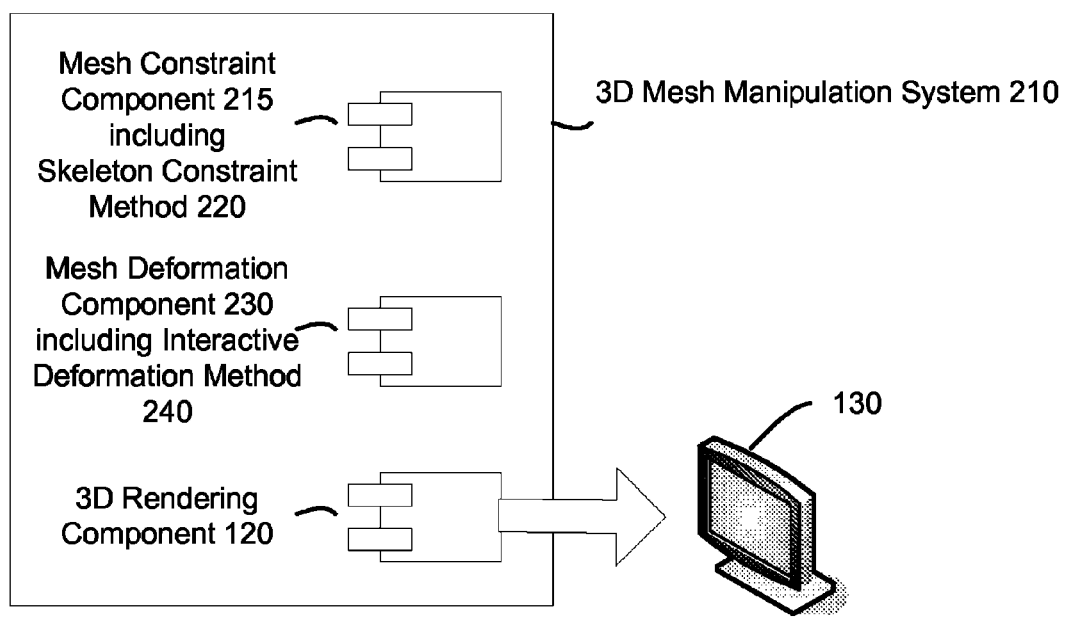
FIG. 2 is a block diagram showing a 3D graphics system including an interactive deformation with non-linear constraints method.

FIG. 2 is a block diagram showing a 3D graphics system including an interactive deformation with non-linear constraints method 200. The 3D graphics system including an interactive deformation with non-linear constraints method 200 may be coupled to a 3D polygon mesh manipulation system 210. The 3D polygon mesh manipulation system 210 may be coupled to an example mesh constraint component 215 and an example polygon mesh deformation component 230. The 3D polygon mesh manipulation system 210 may further include a 3D rendering component 120. The 3D polygon mesh manipulation system 210 may also be coupled to a conventional display device 130. Elements having like numbering from FIG. 1 function similarly and will not be described again.

The system shown may be capable of reading data associated with a 3D polygon mesh, allowing human user interaction with such a 3D polygon mesh, and rendering such a 3D polygon mesh data as previously discussed. For example, the 3D polygon mesh manipulation system 210 may be a typical 3D editor computer software application executing on a conventionally constructed personal computer. Such a system may implement a deformation method 240 for efficiently solving the deformation of a 3D polygon mesh including linear and non-linear constraints. Such a system may further implement a skeleton constraint method 220 for specifying a skeleton constraint on a 3D polygon mesh.

The mesh constraint component 215 and polygon mesh deformation component 230 may be typical software components, assemblies, libraries, or the like, which, when executed, performs a service. The mesh constraint component 215 and skeleton constraint method 220 may be communicatively coupled by software services provided by the 3D polygon mesh manipulation system 210 such that each may exchange information, instructions, or the like. In another example, the mesh constraint component 215 and polygon mesh deformation component 230 may include a combination of software and/or hardware components or the like.

The mesh constraint component 215 may be used to allow a user to specify a constraint on the deformation of a conventional 3D polygon mesh. For example, the mesh constraint component 215 may provide a user interface to allow a skeleton constraint to be specified on a 3D polygon mesh or a portion of a 3D polygon mesh. In another example, the mesh constraint component 215 may provide a user interface to allow a volume constraint and/or projection constraint to be specified on a 3D polygon mesh.

The mesh constraint component 215 may allow a user to specify a volume constraint, a projection constraint, a skeleton constraint, and the like. A volume constraint may preserve the total volume of a 3D polygon mesh. For example, if a 3D polygon mesh is composed of a cube, a volume constraint imposed on such a cube would ensure that if the cube were deformed to the shape of a sphere, the sphere may enclose the same volume as the original cube. A projection constraint may be useful for a user to manipulate a 3D polygon mesh by constraining the movement of a 3D point such that the point may only move along a ray in one of the three dimensions. The effect of such a projection constraint may be such that the user may "lock" one point of a 3D polygon mesh in two dimensions. A skeleton constraint may constrain part of a 3D polygon mesh to be "unbendable" during manipulation by the user. For example, if a user creates a 3D polygon mesh representing a human arm, the user may draw a two dimensional skeleton constraint representing the unbendable areas of the human arm.

The deformation method 240 may allow a user to specify both linear and non-linear constraints as mentioned above, manipulate a 3D polygon mesh, and view the deformed mesh interactively. For example, the user may be able to create a 3D polygon mesh, specify joints or points of articulation, specify control handles, and then manipulate the control handles to position parts of the 3D polygon mesh to new points in three dimensions.

Such a deformation method may first build a coarse control 3D polygon mesh around the original 3D polygon mesh. The building of a coarse control 3D polygon mesh around the original 3D polygon mesh is known to those in the art and will not be discussed here. The vertices of the coarse control 3D polygon mesh may be referred to as the subspace of the coarse control 3D polygon mesh. As discussed with respect to the mesh deformation component 150 of FIG. 1, calculating the deformed mesh may be performed via an energy minimization equation. The deformation energy and non-linear constraints may then be projected onto the coarse control mesh vertices using a mean value interpolation. Mean value interpolation is known to those in the art and will also not be discussed here. The energy minimization equation may then be iteratively solved until the deformed mesh has been created. The deformation method 240 will be more fully described in the description of FIG. 5.

As discussed previously, a user may impose several non-linear constraints on the computation of the deformed mesh. Some non-linear constraints may be expressed as a Boolean, or, true or false value, for example imposing a constraint to maintain volume. Some non-linear constraints may be expressed as data, for example, a skeleton constraint may be expressed as a series of 3D points. An example of how a skeleton constraint may be specified follows.

Figure 3:
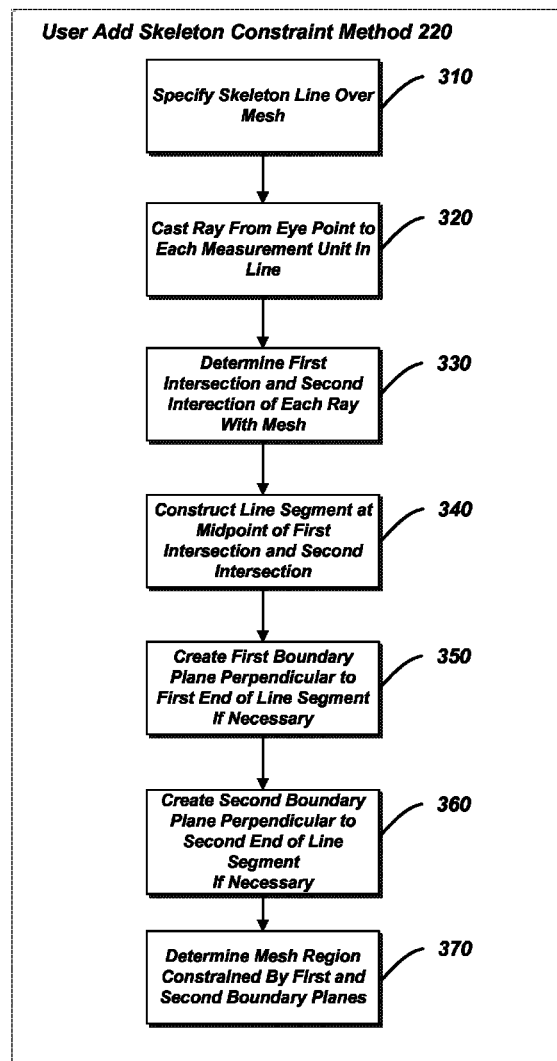
FIG. 3 is a flow diagram showing an example method for a user to add a skeleton constraint to an example polygon mesh.

FIG. 3 is a flow diagram showing an example method 220 for a user to add a skeleton constraint to an example polygon mesh.

Block 310 may refer to an operation in which a two dimensional (2D) skeleton line is specified over a 3D polygon mesh at the "eye point" of the 3D polygon mesh. Such an eye point may refer to the view position of the 3D polygon mesh when the 3D polygon mesh is rendered on a display device. Such an operation may be performed, for example, by a user using a computer mouse to draw or specify a line over a rendered 3D polygon mesh.

Block 320 may refer to an operation in which a ray, or straight line segment, is cast or extended from the eye point of the 3D polygon mesh through each individual measurement unit in the 2D skeleton line for a predetermined length that passes through the entire 3D polygon mesh. For example, the units of measurement of the 2D skeleton line may be screen pixels, and a ray may be cast from the eye point through each pixel in the 2D skeleton line. That is, if the skeleton line is 10 pixels in length, such an operation will extend 10 individual rays from the eye point through each pixel in the 2D skeleton line.

Block 330 may refer to an operation in which the 3D point at which each ray intersects with the 3D polygon mesh is calculated. Such an operation will result in at least two 3D points for each ray as the ray will have been extended for such a length as to intersect at least two surfaces of the 3D polygon mesh at block 320.

Block 340 may refer to an operation in which a line segment is created at a 3D point located on the ray at the midpoint between the 3D points calculated at block 330. Such a midpoint may be an approximation and may be discovered through the use of a least squares fitting algorithm. The operation is repeated for each ray created at block 320. The result of such an operation may be a 3D skeleton line located within the 3D polygon mesh.

Block 350 may refer to an optional operation in which a first boundary plane is created perpendicular to the first end of the 3D skeleton line created at block 340. Such a first boundary plane may be created such that the plane intersects all 3D points of the mesh that have common coordinate with the first end of the 3D skeleton line. That is, each 3D point of the 3D polygon mesh which is intersected by a ray cast from the first end of the 3D skeleton point perpendicularly may be an outer edge of the first boundary plane.

Block 360 may refer to an optional operation in which a second boundary plane is created perpendicular to the second end of the 3D skeleton line created at block 340. Such a second boundary plane may be created such that the plane intersects all 3D points of the mesh that have common coordinate with the second end of the 3D skeleton line. That is, each 3D point of the 3D polygon mesh which is intersected by a ray cast from the second end of the 3D skeleton point perpendicularly may be an outer edge of the second boundary plane.

Block 370 may refer to an operation in which the mesh region constrained by the first boundary plane created at block 350 and the second boundary plane created at block 360 is determined. Such a determination may be accomplished using any method which determines the constrained area. For example, the triangle located on the 3D polygon mesh that are intersected by each ray cast at block 320 may be "grown" or increased in area until each edge of each triangle meets an edge of another triangle or a first boundary plane or second boundary plane.

Figure 4:
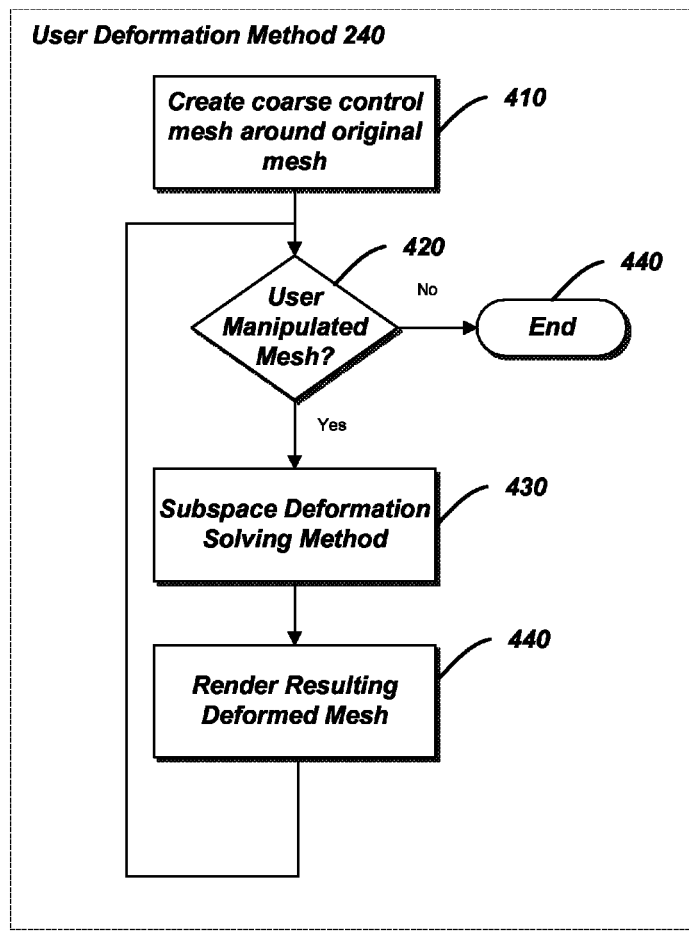
FIG. 4 is a flow diagram showing an example method for a user to deform a polygon mesh and render the result.

FIG. 4 is a flow diagram showing an example method 400 for a user to deform a polygon mesh and render the result.

Block 410 may refer to an operation in which a coarse control 3D polygon mesh is created to encapsulate the original 3D polygon mesh to be deformed. Such an operation may be performed using any suitable method. For example, a coarse control mesh may be created using a progressive convex hull construction method. In another example, if the original 3D polygon mesh is not a "closed" 3D polygon mesh or, a 3D polygon mesh includes at least one area that does not specify a 3D point or polygon, the original 3D polygon mesh is closed by creating a new polygon to fill the empty area. Such as coarse control 3D polygon mesh may or may not be visible to a user.

Block 420 may refer to an operation in which a determination is made as to whether or not a user manipulated at least a portion of the original 3D polygon mesh. Such a determination may be made by inspecting the state of the original 3D polygon mesh and monitoring changes in location of any individual 3D points or polygons included in the original 3D polygon mesh. In response to a positive determination, flow continues to block 430. In response to a negative determination, flow continues to block 440.

Block 440 may refer to an operation in which the example method 400 terminates.

Block 430 may refer to an operation in which the 3D polygon mesh resulting from the "deformation" or manipulation of the original 3D polygon mesh at block 430 is determined or solved. Such an operation will be discussed fully in the discussion of FIG. 5.

Block 440 may refer to an operation in which the resulting deformed or manipulated 3D polygon mesh determined at block 430 is rendered such that the resulting deformed for manipulated 3D polygon mesh may be viewed by a user. Such a rendering of a 3D polygon mesh is well known to those in the art and will not be discussed here.

Figure 5:
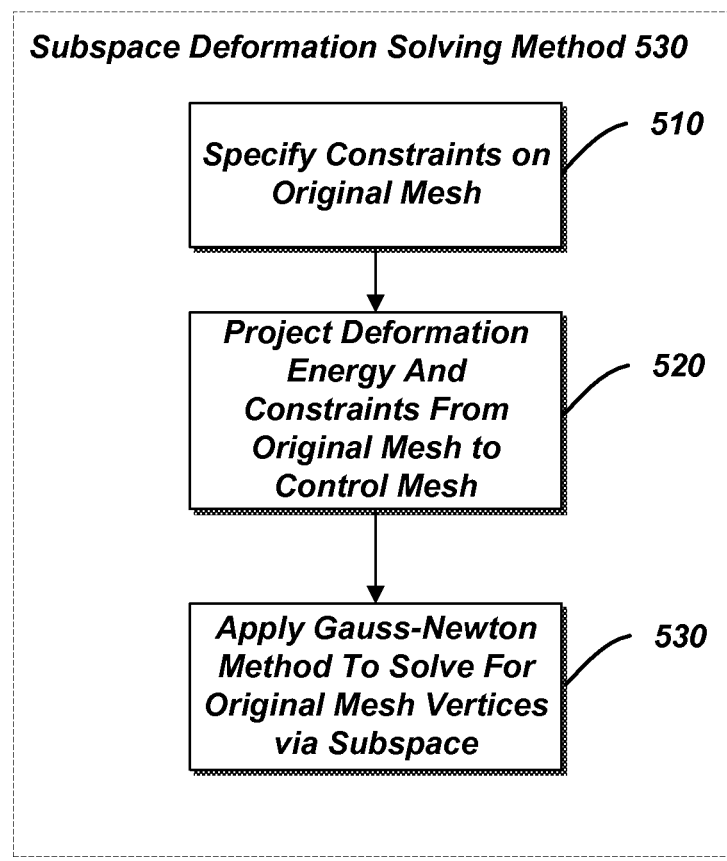
FIG. 5 is a flow diagram showing an example method for determining a deformed polygon mesh using a corresponding subspace deformation.

FIG. 5 is a flow diagram showing an example method 500 for determining a deformed polygon mesh using a corresponding subspace deformation.

Block 510 may refer to an operation in which a user may specify a constraint on the deformation of the original 3D polygon mesh. Such a constraint may be a Laplacian constraint, a skeleton constraint, a volume constraint, a projection constraint, or the like.

For example, the vertex positions X for a 3D polygon mesh may be reconstructed from the corresponding Laplacian coordinates given by the equation $\hat{\delta}=\hat{\delta}(X)$ where $\hat{\delta}(X)$ may represent the Laplacian coordinates of X. That is, a Laplacian constraint may be imposed on the original 3D polygon mesh by implementing the following equation in computer executable form:

$$\mathcal{L} X = \hat{\delta}(X)$$

where $\mathcal{L}$ may represent the Laplacian operator matrix. More particularly, the Laplacian coordinates may be calculated by implementing the following equation in computer executable form:

$$\delta_i = \sum_{j=1}^{n_i} \mu_{ij}((x_{i,j1} - x_i) \otimes (x_{i,j} - x_i))$$

where $\delta_i$ may represent the differential coordinate of an inner vertex $x_i$ of the 3D polygon mesh, $x_{i,1}, \ldots, x_{i,n_i}$ may represent vertices adjacent to $x_i$ $\{T_{ij}=\Delta(x_i, x_{i,j-1}, x_{i,j})\}_{j=1}^{n_i}$ may represent the incident triangles, $\mu_{ij}$ may represent a set of coefficients, and $\otimes$ may represent the cross-product of two vectors in $R^3$.

In another example, a skeleton constraint may be imposed on the original 3D polygon mesh by implementing the following equation in a computer executable form:

$$\begin{cases} \Gamma X = 0 \\ \|\Theta X\| = \hat{\rho} \end{cases}$$

where X may represent the vertices of the original 3D polygon mesh, $\Gamma$ may be a constant r×n matrix with $$(\Gamma)_{ij} = (k_{ij} - k_{i-1,j}) - \frac{1}{r}(k_{rj} - k_{0j}),$$

$k_{rj}$ may be a set of constant coefficients created as the mean value coordinates with respect to the constrained portion of the original 3D polygon mesh, r may be the average length of the unbendable region of the original 3D polygon mesh, $\Theta$ may be a row vector with $(\Theta)_i = k_{rj} - k_{0j}$, and $\hat{\rho}$ may be the length of the 3D skeleton line as determined in the discussion of FIG. 4.

In another example, a volume constraint may be imposed on the original 3D polygon mesh by implementing the following equation in computer executable form:

$$\psi(X) = \hat{\upsilon}$$

where X may represent the vertices of the original 3D polygon mesh, and $\hat{\upsilon}$ may represent the total volume of the original 3D polygon mesh.

In another example, a projection constraint may be imposed on the original 3D polygon mesh by implementing the following equation in computer executable form:

$$\Omega X = \hat{\omega}$$

where $\Omega$ may represent a constant 2×3n matrix and $\hat{\omega}$ may represent a constant column vector.

Block 520 may refer to an operation in which the deformation energy of the original 3D polygon mesh and the constraints specified at block 510 are projected to the vertices of the coarse control 3D polygon mesh created at block 410 of FIG. 4. The vertices of the coarse control 3D polygon mesh may be referred to as the subspace of the coarse control 3D polygon mesh. Such an operation may be performed using a mean value interpolation operation. However, any acceptable method which projects the deformation energy of the original 3D polygon mesh and any constraints imposed upon the original 3D polygon mesh to the coarse control mesh may be used. For example, the deformation energy of the original 3D polygon mesh and constraints may be projected to the vertices of the coarse control 3D polygon mesh by implementing the following equation in computer executable form:

$$\text{minimize}\|(LW)P - b(WP)\|^2 \text{ subject to } g(WP) = 0$$

where P may represent the vertices of the coarse control 3D polygon mesh, L may refer to a constant matrix, b(WP) may be a vector function with a Jacobian value that is small enough to be suitable, and g(WP) may represent the constraints.

For example, if the constraints discussed at block 510 are included, the following matrices and vector functions may be used for the above equation:

$$L = \begin{pmatrix} A \\ \Phi \\ \Gamma \\ \Theta \end{pmatrix}, b(X) = \begin{pmatrix} \delta(X) \\ \hat{\nu} \\ 0 \\ \hat{\rho}\frac{\Theta x}{\|\Theta x\|} \end{pmatrix}, \text{ and } g(X) = \begin{pmatrix} \Omega X - \hat{\omega} \\ \psi(X) - \hat{\upsilon} \end{pmatrix}$$

Block 530 may refer to an operation in which the Gauss-Newton method may be used to determine the deformed 3D polygon mesh. For example, the deformed 3D polygon mesh may be determined by implementing the following function in computer executable form:

$$h_p = -(W^tL^tLW)^{-1}(W^tL^tf + (J_gW)^t\lambda) \text{ where}$$

$$\lambda_p = -((J_gW)(W^tL^tLW)^{-1}(J_gW)^t)^{-1}(g - (J_gW)(W^tL^tLW)^{-1}W^tL^tf), W$$

may represent a matrix that interpolates the original 3D polygon mesh from the coarse control 3D polygon mesh, $J_g$ may represent the Jacobian of g.

For example, an iteration step size may be selected and for each iteration setting $W_p = W_{p-1} + ah_p$ then substituting the result in the following equation in computer executable form:

$$\text{minimize}\|(LW)P - b(WP)\|^2 \text{ subject to } g(WP) = 0.$$

Figure 6:
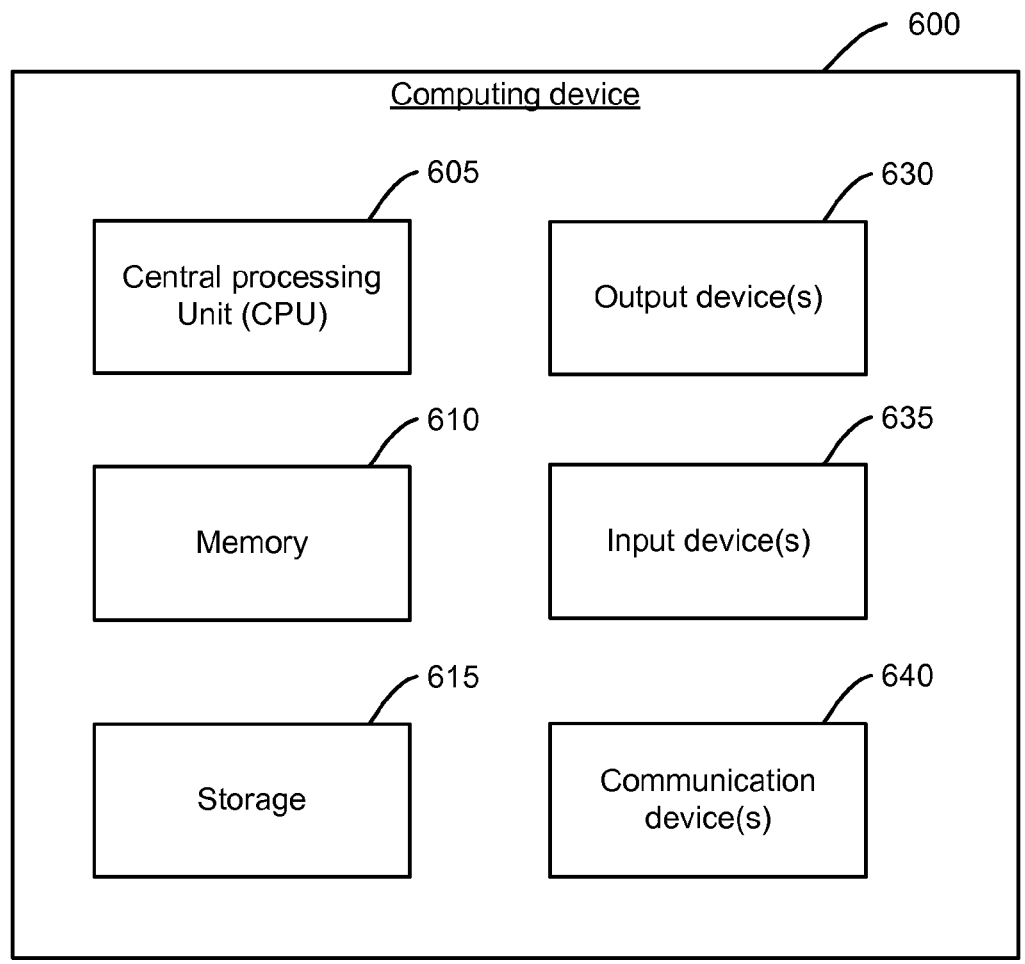
FIG. 6 is a block diagram of an example computer device for implementing the described systems and methods.

FIG. 6 shows an exemplary computer device 600 for implementing the described systems and methods. In its most basic configuration, computing device 600 typically includes at least one central processing unit (CPU) 605 and memory 610.

Depending on the exact configuration and type of computing device, memory 600 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 615. Computer storage media includes volatile and nonvolatile, removable and non-removable media implemented in any method or technology for storage of information such as computer readable instructions, data structures, program modules or other data. Memory 610 and storage 615 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 640 that allow the device to communicate with other devices. Communications device(s) 640 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 635 such as keyboard, mouse, pen, voice input device, touch input device, etc. Output device(s) 630 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The claimed invention is:

1. A method for constraining a region of a polygon mesh, the method comprising:
    receiving, from a user, a specifying a skeleton line over the polygon mesh at an eye point of the polygon mesh;
    casting a ray from the eye point through each measurement unit in the skeleton line for a predetermined length that passes through an entirety of the polygon mesh;
    calculating, by a computing device, a point at which each cast ray intersects the polygon mesh, the calculating resulting in two calculated points for each of the cast rays;
    creating a line segment at another point on each cast ray at a midpoint between the corresponding two calculated points;
    creating a first boundary plane that is perpendicular to a first end of the skeleton line;
    creating a second boundary plane that is perpendicular to a second end of the skeleton line;
    determining the region of the polygon mesh to be constrained by the first boundary plane and by the second boundary plane
    wherein the method is performed by a computer.

2. The method of claim 1 where the constrained region is unbendable during manipulation of the polygon mesh.

3. The method of claim 1 where the eye point refers to a view position of the polygon mesh as rendered on a display device.

4. The method of claim 1 where the measurement units comprise screen pixels.

5. The method of claim 1 where the casting results in each cast ray intersecting at least two surfaces of the polygon mesh.

6. The method of claim 1 where at least one of the midpoints is approximated.

7. The method of claim 1 where the first boundary plane intersects all 3D points of the polygon mesh having a coordinate in common with the first end, and where the second boundary plane intersects all 3D points of the polygon mesh having a coordinate in common with the second end.

8. At least one computer storage device storing computer-executable instructions that, when executed by a computing device, cause the computing device to perform a method for constraining a region of a polygon mesh, the method comprising:
    receiving, from a user, a specifying a skeleton line over the polygon mesh at an eye point of the polygon mesh;
    casting a ray from the eye point through each individual measurement unit in the skeleton line for a predetermined length that passes through an entirety of the polygon mesh;
    calculating a point at which each cast ray intersects the polygon mesh, the calculating resulting in two calculated points for each of the cast rays;
    creating a line segment at another point on each cast ray at a midpoint between the corresponding two calculated points;
    creating a first boundary plane that is perpendicular to a first end of the skeleton line;
    creating a second boundary plane that is perpendicular to a second end of the skeleton line;
    determining the region of the polygon mesh constrained by the first boundary plan and by the second boundary plane.

9. The least one computer storage device of claim 8 where the constrained region is unbendable during manipulation of the polygon mesh.

10. The least one computer storage device of claim 8 where the eye point refers to a view position of the polygon mesh as rendered on a display device.

11. The least one computer storage device of claim 8 where the measurement units comprise screen pixels.

12. The least one computer storage device of claim 8 where the casting results in each cast ray intersecting at least two surfaces of the polygon mesh.

13. The least one computer storage device of claim 8 where at least one of the midpoints is approximated.

14. The least one computer storage device of claim 8 where the first boundary plane intersects all 3D points of the polygon mesh having a coordinate in common with the first end, and where the second boundary plane intersects all 3D points of the polygon mesh having a coordinate in common with the second end.

15. A system comprising:
    a computing device configured for receiving, from a user, a specifying a skeleton line over the polygon mesh at an eye point of the polygon mesh;
    the computing device further configured for casting a ray from the eye point through each individual measurement unit in the skeleton line for a predetermined length that passes through an entirety of the polygon mesh;
    the computing device further configured for calculating a point at which each cast ray intersects the polygon mesh, the calculating resulting in two calculated points for each of the cast rays;
    the computing device further configured for creating a line segment at another point on each cast ray at a midpoint between the corresponding two calculated points;
    the computing device further configured for creating a first boundary plane that is perpendicular to a first end of the skeleton line;
    the computing device further configured for creating a second boundary plane that is perpendicular to a second end of the skeleton line;

the computing device further configured for determining the region of the polygon mesh constrained by the first boundary plan and by the second boundary plane.

16. The system of claim 15 where the constrained region is unbendable during manipulation of the polygon mesh.

17. The system of claim 15 where the eye point refers to a view position of the polygon mesh as rendered on a display device.

18. The system of claim 15 where the measurement units comprise screen pixels.

19. The system of claim 15 where the casting results in each cast ray intersecting at least two surfaces of the polygon mesh.

20. The system of claim 15 where the first boundary plane intersects all 3D points of the polygon mesh having a coordinate in common with the first end, and where the second boundary plane intersects all 3D points of the polygon mesh having a coordinate in common with the second end.

* * * * *